UNITED STATES PATENT OFFICE.

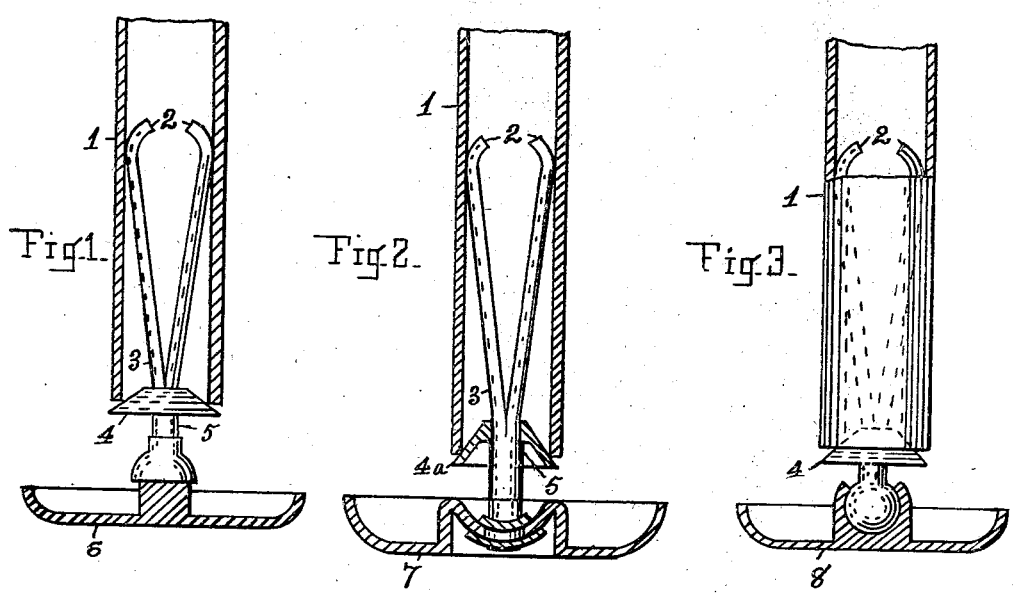

ORTON C. LITTLE, OF MENASHA, WISCONSIN, ASSIGNOR OF ONE-FOURTH TO EDWARD V. TRELEVEN, OF MENASHA, WISCONSIN.

SPRING-RETAINER FOR SLIDING SHOES.

No. 886,301.        Specification of Letters Patent.        Patented April 28, 1908.

Application filed June 16, 1906. Serial No. 322,057.

*To all whom it may concern:*

Be it known that I, ORTON C. LITTLE, a citizen of the United States, residing at Menasha, in the county of Winnebago and State of Wisconsin, have invented a new and useful Improvement in Spring-Retainers for Sliding Shoes, of which the following is a specification.

My invention relates to a spring retainer for tubes, and particularly for use upon sliding shoes for furniture, for their application to a tubular article, such for instance as their attachment to the metallic tubular legs of a bedstead, chair, &c., and the object of the invention is to adapt the sliding shoe for an easy and quick application to a tubular article, the tubes of which are of various diameter, the invention consisting of a split pin formed of resilient material, having its free ends suitably curved for their easy entrance into a tube, the lower or closed end of the pin being provided with a cone shaped collar of a diameter at the larger end of the cone exceeding the interior diameter of the tube to which the retainer is to be applied, and below said collar, means for the attachment thereto of a sliding shoe, the improvement being illustrated in the accompanying drawing, in which,—

Figure 1 is a vertical section of the lower end of a tube having therein my improvement in elevation, applied to a sliding shoe for furniture, shown in section vertically. Fig. 2 is a vertical section of the lower end of a tube, having my improvement in elevation applied to it, the surface of the cone near the lower end of the split pin being in section, and of a different angle from the cone in Fig. 1, and the sliding shoe to which the retainer is attached being in section and of a different construction from the one shown in Fig. 1. Fig. 3 is an elevation showing a short piece of a tube, its upper end being in section, the tube having my improvement applied to it with another modification in the style of sliding shoe to which the bushing is attached.

Similar numerals and letters indicate like parts in the several views.

1, indicates a piece of tube to which it is desired to attach means for the easy moving of the article of which the tube is a part, the tube being for instance, the post of an iron or brass bedstead, or other article of furniture. The tubular posts of these bedsteads are of various diameters and in order to provide a sliding shoe with means for its easy and quick attachment to the various sizes of tubes, this retainer has been devised. It consists of a split pin of less than half the diameter of the tube with which it is to be used, in the larger sizes of tubes in which they are designed to be used they being less than 1/6 of their diameter, the pins being formed of spring metal and having a cone shaped collar, the free ends of the pin being for centering and holding the upper end of the pin within the tube, and the cone for centering its lower end and supporting the tube upon the cone. The free ends 2 of the pin 3 are spread apart and curved outwardly and then inwardly so that the resiliency of said ends will retain the pin within the tube while allowing its easy entrance, only sufficient friction of the free ends within the tube being required to hold the pin and its attached sliding shoe from dropping out as the tube is raised from the floor.

For holding the lower end of the pin in a central position within the tube, a cone 4 or 4$^a$, is placed upon the pin, the shape of the cone being governed by the use to which the bushing is to be put. These cones may be of any desired taper, and neither style will need to be fixed in position upon the pin, but may be loosely mounted thereon and rest upon a narrow shoulder, 5.

The split pins may be made of any suitable size or form of material, having the necessary "spring quality," but will usually be of half round steel bars, and the cones may be stamped out of sheet metal, or cast, as their particular use may require.

6, 7, and 8, indicate the sliding shoes. The shoes being connected with the split pin of the retainer by means of a universal joint of limited movement, owing to the large surface which they present for the support of the article to be moved, are easily slid along upon a rug or carpet without wrinkling it, or upon a bare floor without marring the same.

Having described my invention, what I claim and desire to secure by Letters-Patent, is,—

In a retainer for sliding shoes for detachably connecting them with tubular legs of furniture, the combination with a shoe of a pin of half the diameter or less, than that of the tube in which the pin is to be used, it being split into two leaves for part of its length, their outer ends being spaced apart, and then curved inwardly and their extreme ends normally left separated from each other for their
5 easy entrance into for filling the tube diametrically and for their retention therein, and a plain faced cone shaped collar mounted upon the pin below its split adapted for centering the pin, and for sustaining tubes of different diameter thereon, substantially as set forth.

ORTON C. LITTLE.

Witnesses:
HARRY C. BULLARD,
SILAS BULLARD.